(12) United States Patent
Nielsen et al.

(10) Patent No.: US 8,234,368 B1
(45) Date of Patent: Jul. 31, 2012

(54) SYSTEM, METHOD, AND COMPUTER PROGRAM FOR REPORTING A COMMUNICATION FLOW TO A LAWFUL INTERCEPT FRAMEWORK

(75) Inventors: Eric H. S. Nielsen, Santa Cruz, CA (US); Biju Varghese, Bangalore (IN)

(73) Assignee: BroadSoft, Inc., Gaithersburg, MD (US)

( * ) Notice: Subject to any disclaimer, the term of this patent is extended or adjusted under 35 U.S.C. 154(b) by 200 days.

(21) Appl. No.: 12/341,957

(22) Filed: Dec. 22, 2008

Related U.S. Application Data

(60) Provisional application No. 61/015,553, filed on Dec. 20, 2007.

(51) Int. Cl.
*G06F 15/173* (2006.01)

(52) U.S. Cl. ...................................... 709/224

(58) Field of Classification Search .......... 709/223–226; 370/252, 389, 238
See application file for complete search history.

(56) References Cited

U.S. PATENT DOCUMENTS

| | | | |
|---|---|---|---|
| 7,092,493 B2 * | 8/2006 | Hou et al. | 379/35 |
| 7,657,011 B1 * | 2/2010 | Zielinski et al. | 379/93.02 |
| 7,730,521 B1 * | 6/2010 | Thesayi et al. | 726/4 |
| 7,950,046 B2 * | 5/2011 | Kropivny | 726/3 |
| 2004/0202295 A1 * | 10/2004 | Shen et al. | 379/112.01 |
| 2007/0036151 A1 * | 2/2007 | Baeder | 370/352 |
| 2008/0310425 A1 * | 12/2008 | Nath et al. | 370/395.54 |
| 2009/0130984 A1 * | 5/2009 | Lee | 455/67.11 |

OTHER PUBLICATIONS

"PKT-SP-ESP1.5-I01-050128: PacketCable™ 1.5 Specifications: Electronic Surveillance," Jan. 28, 2005, http://cable-labs.com/specifications/archives/PKT-SP-ESP1.5-101-050128.pdf.
"PKT-SP-ES-INF-I02-061013: PacketCable™ 2.0 Electronic Surveillance Intra-Network Specification," Oct. 13, 2006, http://www.packeteable.com/downloads/specs/PKT-SP-ES-INF-I02-061013.pdf.
"ETSI TS 101 671 V2.15.1 (Nov. 2006) Lawful Interception (LI); Handover interface for the lawful interception of telecommunications traffic," Nov. 2006, http://pda.etsi.org/exchangefolder/ts_101671v021501p.pdf.
"ETSI ES 201 671 V2.1.1 (Sep. 2001) Telecommunications security; Lawful Interception (LI); Handover interface for the lawful interception of telecommunications traffic," Jul. 2001.
Telecommunications Industry Association, TR-45, ANSI/J-STD-025-A, Lawfully Authorized Electronic Surveillance, Feb. 2003, USA (204 pages).

* cited by examiner

*Primary Examiner* — Joseph Avellino
*Assistant Examiner* — Mark O Afolabi
(74) *Attorney, Agent, or Firm* — Jenkins, Wilson, Taylor & Hunt, P.A.

(57) ABSTRACT

A system, method, and computer program product are provided for reporting a communication flow to a lawful intercept framework. In one embodiment, a plurality of actions associated with at least one communication is monitored for lawful intercept purposes. Additionally, the actions are correlated into a communication flow independent of an address associated with the actions. Furthermore, the communication flow is reported to a lawful intercept framework. In another embodiment, an action associated with a communication flow is identified for lawful intercept purposes. In addition, an action is reported to a lawful intercept framework utilizing a first semantic, and a description of the action is reported to the lawful intercept framework utilizing a second semantic, where the first semantic is different from the second semantic and where in response to a determination that the description is unknown at a time that the action occurs, the reporting of the action for the purposes of lawful intercept is distinct from the reporting of the description of the action for preventing delay in reporting the action as a result of waiting for acquisition of the description of the action. In yet another embodiment, a plurality of information about individual communications sessions or circuits that are portions of a communication flow being monitored for lawful intercept purposes is collected. Further, the portions are correlated into the communication flow. Still yet, the communication flow is reported to a lawful intercept framework.

13 Claims, 10 Drawing Sheets

SYSTEM, METHOD, AND COMPUTER PROGRAM FOR REPORTING A COMMUNICATION FLOW TO A LAWFUL INTERCEPT FRAMEWORK

RELATED APPLICATIONS

The present application claims priority from U.S. Provisional Application No. 61/015,553, filed Dec. 20, 2007, which is incorporated herein by reference in its entirety for all purposes.

FIELD OF THE INVENTION

The present invention relates to communication flows, and more particularly to reporting communication flows.

BACKGROUND

Traditionally, lawful intercept frameworks have been utilized to intercept communications for the purpose of law enforcement. For example, legal authorities have intercepted such communications for illegal activity based on laws and/or other regulations. Unfortunately, techniques utilized to identify and/or report communication flows for interception have exhibited various limitations.

Just by way of example, conventional lawful intercept implementations have been defined to simply trace target phone numbers, email addresses, and other specific addresses of record. They have generally monitored use of these addresses of record for communications, and have monitored feature settings associated with these addresses. Further, lawful intercept mechanisms for calls have only been tuned to reporting a serialized stream of actions associated with a particular address, where reportable redirections in signaling are associated with redirection of call content (e.g. media). Thus, conventional lawful intercept implementations have been incapable of identifying communication flows, such as voice over internet protocol (VoIP) communication flows, which consist of asynchronously reported actions associated with multiple addresses.

Furthermore, many applications are not lawful intercept aware, and some applications autonomously create new call sessions in reaction to communications attempts to target subscribers. In addition, for those applications that are lawful intercept aware, the complexity of combining lawful intercept content capture with such features oftentimes becomes cumbersome and failure prone, which may increase the likelihood that call behavior has changed subtly, or worse, may induce subtle bugs. Moreover, the combinatorial explosion of possible call control action combinations becomes unmanageable from a testing and quality assurance standpoint.

There is thus a need for addressing these and/or other issues associated with the prior art.

SUMMARY

A system, method, and computer program product are provided for reporting a communication flow to a lawful intercept framework. In one embodiment, a plurality of actions associated with at least one communication is monitored for lawful intercept purposes. Additionally, the actions are correlated into a communication flow independent of an address associated with the actions. Furthermore, the communication flow is reported to a lawful intercept framework. In another embodiment, an action associated with a communication flow is identified for lawful intercept purposes. In addition, an action is reported to a lawful intercept framework utilizing a first semantic, and a description of the action is reported to the lawful intercept framework utilizing a second semantic, where the first semantic is different from the second semantic and where in response to a determination that the description is unknown at a time that the action occurs, the reporting of the action for the purposes of lawful intercept is distinct from the reporting of the description of the action for preventing delay in reporting the action as a result of waiting for acquisition of the description of the action. In yet another embodiment, a plurality of information about individual communications sessions or circuits that are portions of a communication flow being monitored for lawful intercept purposes is collected. Further, the portions are correlated into the communication flow. Still yet, the communication flow is reported to a lawful intercept framework.

DETAILED DESCRIPTION

Figure 1:
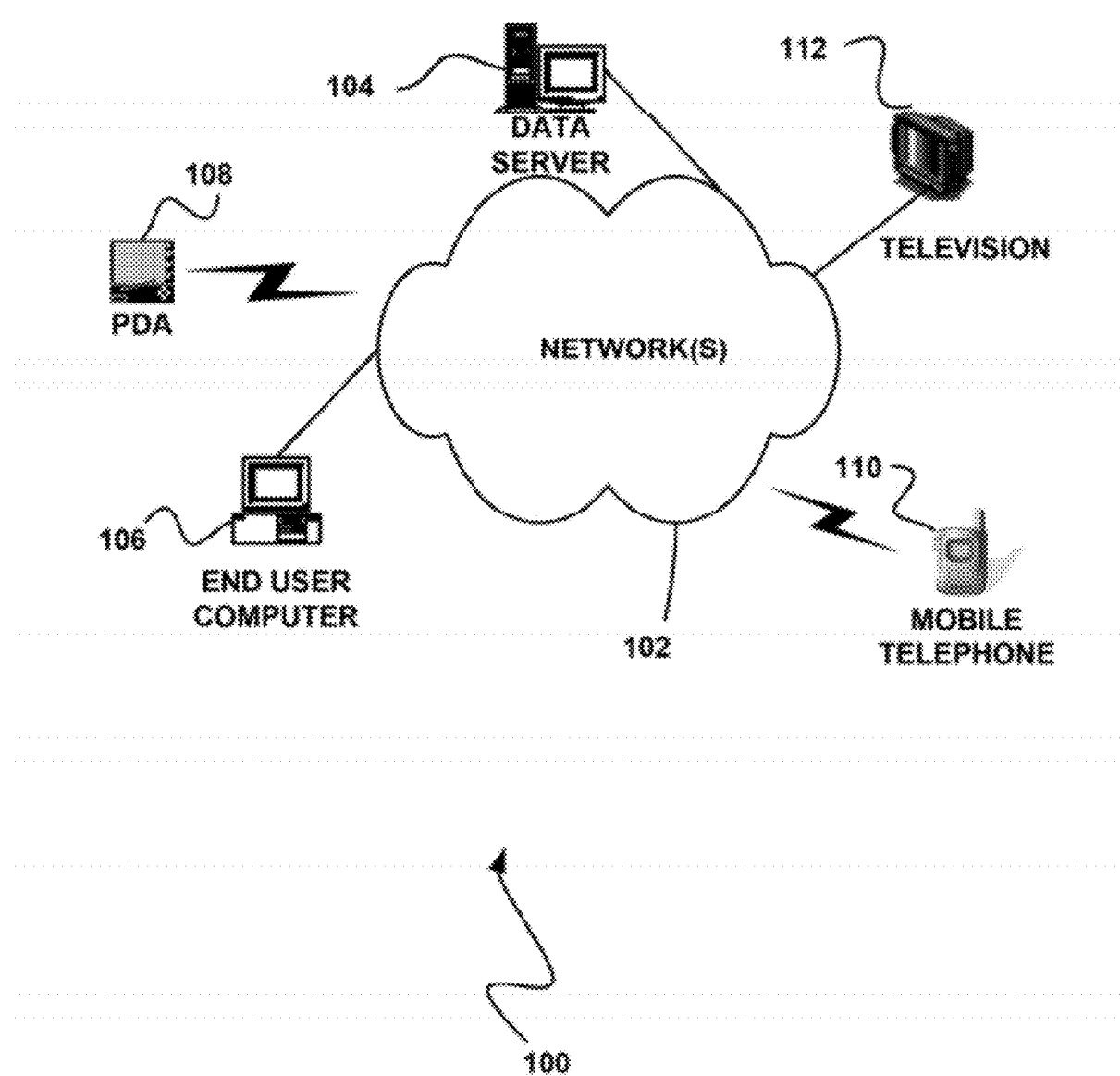
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
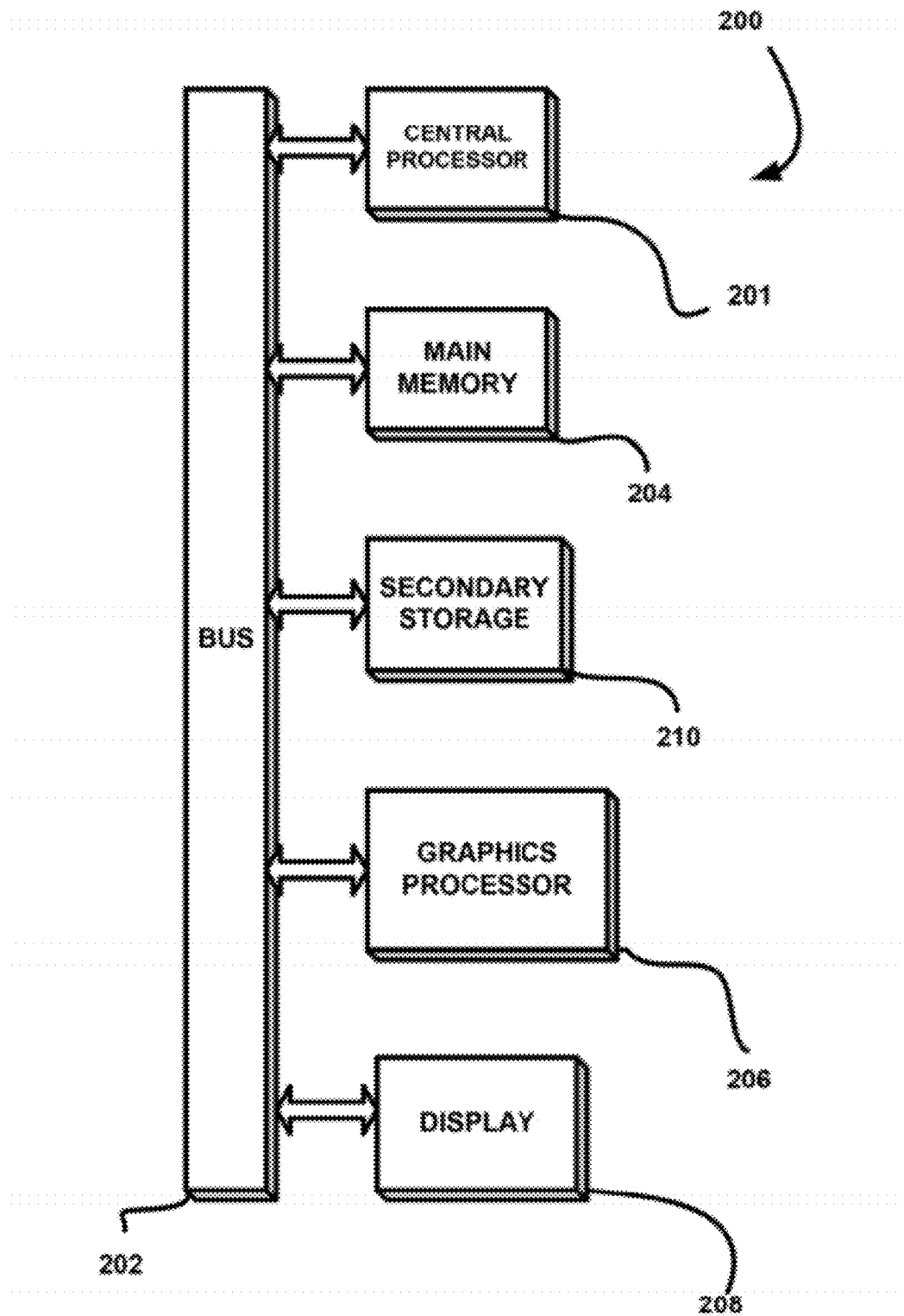
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
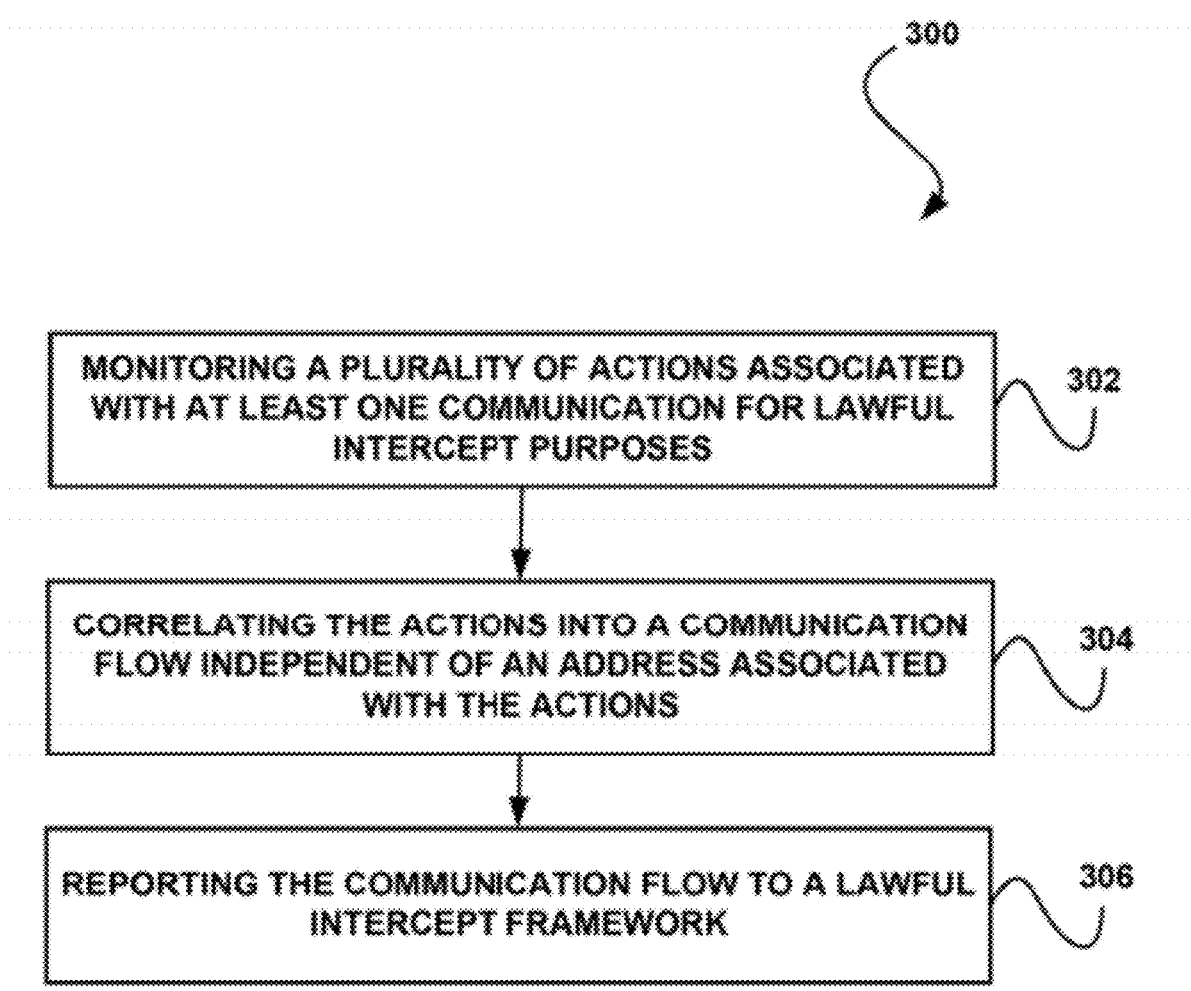
FIG. 3 illustrates a method for reporting a communication flow including correlated actions to a lawful intercept framework, in accordance with one embodiment.

FIG. 3 illustrates a method 300 for reporting a communication flow including correlated actions to a lawful intercept framework, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a plurality of actions associated with at least one communication is monitored for lawful intercept purposes. In the context of the present description, the communication may include any transfer of content. For example, the communication may include a call (e.g. a VoIP call, etc.), a session, etc. In various embodiments, the communication may include a transfer of voice, text, multi-media, etc.

Additionally, it should be noted that the communication may be performed utilizing any desired device, such as a telephone, a computer, a mobile wireless device, and/or any of the devices described above with respect to FIGS. 1 and/or 2. In one embodiment, the communication may be performed over a network. The network may include a telecommunications service provider (TSP) network, for example.

Further, the communication may be associated with (e.g. invoked by, received by, etc.) a subscriber. Such subscriber may include a person or legal entity that contracts for communications services from a TSP, and is associated with a private or public identifier, such as an E.164 compliant phone number. In addition, the subscriber may be provisioned within a network of the TSP such that communication actions associated therewith, optionally including content of such communication, are reported (e.g. in real-time) to a law enforcement agency, as described below in more detail.

To this end, the actions may optionally be invoked by the subscriber. As another option, the actions may be invoked by a TSP application. Of course, as another option, the actions may be invoked in any desired manner. In various exemplary embodiments, the actions may include origination, rerouting, redirection, answer, termination, digit dialing, etc.

In one embodiment, the actions associated with the communication may include a single initiating action. For example, the single initiating action may involve any aspect of communications privileges of a subscriber. Such communications privileges may include, but are not necessarily limited to, call initiation, a call termination attempt, a group pickup event, an intercom event, a bridged line appearance event, any initiation or redirection of a call from a non-phone endpoint (e.g. a web page or pop-up application), etc.

In another embodiment, the actions associated with the communication may include the actions and/or events that occur due to real-time action of the subscriber or other participant associated with the communication, due to execution of a pre-defined application policy on behalf of the subscriber, or that are associated with the any communication associated an authorization of the subscriber. In yet another embodiment, the actions associated with the communication may include serial actions, multiple related asynchronous and/or parallel actions, etc. under the authorization of the subscriber or any other communication participant (e.g. where application polices further expand am extent of the communication). Accordingly, the at least a portion of the actions associated with the communication may optionally include asynchronous actions and/or concurrent actions (e.g. may be performed in parallel).

In yet another embodiment, the actions associated with the communication may include call rerouting events not specially programmed into an interface associated with interception related information (IRI), hereinafter referred to as HI2. Just by way of example, the HI2 may be associated with communications of the subscriber, such as participants of the communications, times of the communications, redirections actions associated with the communications, etc.

In still yet another embodiment, the actions associated with the communication may include any aspect of routing (e.g. performed by the subscriber who is authorized to make changes to the communication) that is associated with the communication. The routing decisions may occur in real-time, but may be pre-programmed as specialized data or as executable software. The decisions may be generic to all subscribers of a communications system, or may be specific to the subscriber associated with the communication. Real-time routing decisions may optionally occur from many different interfaces, such as the physical communication device in use by the subscriber.

For example, in one embodiment, the actions associated with the communication may include low-level call rerouting events. Optionally, all routing events may be treated as service events. These events may be invoked automatically by software, or by some real-time intervention of a participant in the communication. An additional subject signal action may be identified as an indication of the real-time actions performed specifically by the subscriber. These actions may occur via any authorized control, whether it is part of the same physical communications device or some remote internet interface. Network signals may be used as actions to describe the experience as perceived by the subscriber, or by someone attempting to communicate with the subscriber.

In another embodiment, the actions associated with the communication may include telephony events triggered (e.g. forwarded to the subscriber) over non-telephony interfaces and/or actions that affect the communication and that are performed from non-telecommunications interfaces.

Of course, while various examples of actions associated with the communication have been described above, it should be noted that the actions may include any events that occur with respect to the communication.

Further, the actions may be monitored in any desired manner that is for lawful intercept purposes. Such lawful intercept purposes may include any lawful interception of the actions for real-time reporting thereof, as described in more detail below. The monitoring may include tracing, for example. In one embodiment, the actions may be monitored by an access function (AF). The access function may include a component in a telecommunications architecture which isolates the actions associated with the communication, including any communication-identifying information.

Moreover, as shown in operation 304, the actions are correlated into a communication flow independent of an address associated with the actions. With respect to the present description, the communication flow may include any correlated actions that are representative of the communication. For example, in one embodiment, the communication flow may include a single logical call. The single logical call may optionally be composed of complex, multi-step communication setup actions and in-progress actions (e.g. performed on behalf of the subscriber).

Optionally, the communication flow may be composed of multiple call sessions. As another option, control of these call sessions may occur via multiple separate controls. As yet another option, each of the call sessions may be connected with one or more session authentications. To this end, the communication flow may include a single initiating action, actions invoked by the subscriber or other participants of the communication, serial actions, asynchronous actions, etc.

In one exemplary embodiment, the communication flow may include a single conference call, where the actions correlated into the communication flow may be associated with three separate traces, each trace specific to a different participant of the single conference call. For each trace, and from a circuit switch point of view, the actions may be associated with setting up and tearing down of the conference call. For example, the actions may include multiple calls, some combined, transferred, etc. Thus, each action-portion of the conference call may be correlated into the communication flow. Since there may be flexibility in how the actual communication flow is assembled, redirected, terminated, etc., additional semantics may be utilized to indicate the experience of the subscriber or experiences caused others by the subscriber.

Correlating the actions into the communication flow may include aggregating the actions, compiling the actions, etc. into an object and/or any other structure which represents an actual performed communication flow that encompassed the actions. Since the actions are monitored for lawful intercept purposes, the actions may be correlated as they are performed. In one embodiment, the actions may be correlated beginning with an initial action of a communication (e.g. a call) that includes the subscriber's number and ending with an action that terminates the communication.

In one embodiment, the actions may be correlated utilizing a collection function (CF). The CF may receive the actions for correlation thereof. As an option, the collection function may be a component of a law enforcement agency system (e.g. in a telecommunications lawful interception architecture). As another option, the CF may receive the actions for correlation thereof from the HI2 and from a call content interface utilized for identifying the content of the communication, hereinafter referred to as HI3. Optionally, a delivery function may be the source of data provided over the HI2 and the HI3.

As noted above, the actions may be correlated in any manner that is independent of an address associated with (e.g. a source of, etc.) the actions. Such address may include a telephone number, email address, etc. Since the actions may be associated with multiple different addresses or no address at all, multiple different communications, etc., correlating the actions independent of an address associated with the actions may ensure that all actions included in a communication flow are correlated into the communication flow.

In one embodiment, the actions may be correlated according to the subscriber associated with the actions (e.g. that invoked the communication, etc.). For example, a unique identifier may be associated with the subscriber. As another example, the subscriber may be associated with a primary public switched telephone network (PSTN) or private number, as well as other multiple PSTN or private phone numbers via which communication to and/or from the subscriber may be provided. Additional contact information, such as an email address or instant messaging addresses, may also be associated with the subscriber.

To this end, the actions may be correlated utilizing the unique identifier associated with the subscriber. For example, an address (e.g. the private number, email address, etc.) utilized to perform the actions may be used to query a database. The database may store the unique identifier of the subscriber in association with the address, such that the query may return the unique identifier of the subscriber. As a result, it may be determined that the address is associated with the unique identifier, and thus associated with the subscriber. Further, based on such determination, all actions with an address associated with the unique identifier of the subscriber may be correlated.

Still yet, the communication flow is reported to a lawful intercept framework, as shown in operation 306. With respect to the present description, the lawful intercept framework may include any framework (e.g. system, collection of applications, server, etc.) utilized for intercepting communication flows for the purpose of law enforcement. For example, the lawful intercept framework may verify whether the communication flows are complying with laws and/or other regulations, and may react based on such verification (e.g. may report non-compliance to a law enforcement agency, etc.).

In one embodiment, the communication flow may be reported via at least one interface. For example, the interface may be coupled to the access function monitoring the actions associated with the communication. As an option, the interface may include a handover interface (HI). The HI may include any standardized interface for reporting the communication flow to the lawful intercept framework. In one embodiment, the HI may include an administrative interface for provisioning the reporting to the lawful intercept framework, the HI2 and/or the HI3.

In this way, in addition to reporting the (IRI) associated with the communication, the communication's IRI may be referenced to the call content captured, typified by the HI3 interface. The call content may be captured for the entire call without indication to participants in the communication. Thus, all telephony-related features and advanced applications may still work normally.

It should be noted that the communication flow may be reported in any desired manner. In one embodiment, the communication flow may be reported by reporting each of the actions correlated into the communication flow. For example, each of the actions may be reported separately. In this way, the communication flow may optionally be reported in real-time as each action occurs.

By correlating the actions independent of the address associated with the actions into the communication flow, and reporting such communication flow, as described above, the an entire representation of the communication flow may be provided to the lawful intercept framework (eg.g ANSI/J-STD-025-A-2003). In addition, by reporting the communication flow to the lawful intercept framework, all aspects of the subscriber's communications may optionally be reported, including routing, copies of actual content transferred, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
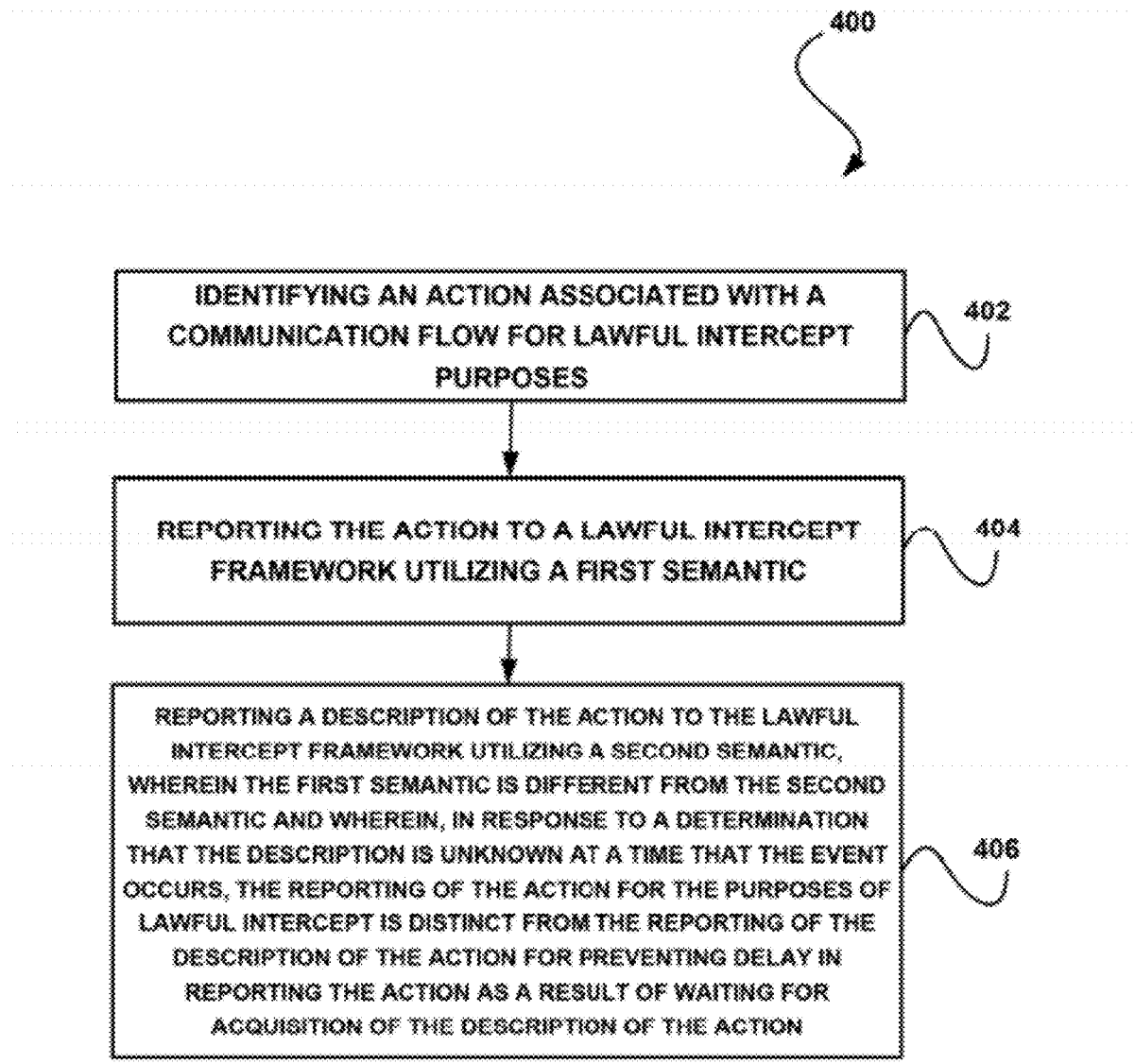
FIG. 4 illustrates a method for reporting an action to a lawful intercept framework utilizing a first semantic and a description of the action to the lawful intercept authorizing utilizing a second semantic, in accordance with another embodiment.

FIG. 4 illustrates a method for reporting an action to a lawful intercept framework utilizing a first semantic and a description of the action to the lawful intercept authorizing utilizing a second semantic, in accordance with another embodiment. As an option, the method 400 may be carried out in the context of the details of FIGS. 1-3. Of course, however, the system 400 may be carried out in any desired environment. Further, the aforementioned definitions may equally apply to the description below.

As shown in operation 402, an action associated with a communication flow is identified for lawful intercept purposes. It should be noted that the action may include any type of action that is capable of being associated with a communication, such as call rerouting events, a call initiating action, etc. In one embodiment, the action may be identified in response to an occurrence of the action. For example, the action may be identified by monitoring a device via which the action is performed.

Table 1 illustrates various examples of actions including HI2 call event messages that are in accordance with the PKT-SP-ESP1.5-I01-050128 specification. It should be noted that such exemplary actions are set forth for illustrative purposes only, and thus should not be construed as limiting in any manner.

TABLE 1

| HI2 Call Event Message (without call content tracing) | Description from PKT-SP-ESP1.5-I01-050128 |
| --- | --- |
| Origination | The surveillance subject is attempting to originate a call |
| Termination Attempt | There is a call attempt to a surveillance subject |
| Answer | A two-way connection has been established for a call under surveillance |
| Redirection | A call under surveillance is redirected (e.g., via termination special service processing or via a call transfer |
| Conference Party Change | A third, or more additional parties are added to an existing call to form a conference call, or any party in a conference call is placed on hold, or retrieved from hold |
| Release | The resources for a call under surveillance have been released |
| NetworkSignal | The TSP network requested the application of a signal toward the surveillance subject |
| ServiceInstance | A defined service event has occurred |
| SubjectSignal | The surveillance subject sends dialing or signaling information to the TSP network to control a feature or service |

Additionally, the action is reported to a lawful intercept framework utilizing a first semantic, as shown in operation 404. The first semantic may include a predefined format utilized for reporting the action. For example, the first semantic may include a packet-cable specification HI2 reporting semantic that is within the acceptable use of that protocol.

The first semantic may be in accordance with the PKT-SP-ESP1.5-I01-050128 specification. To this end, the first semantic may optionally include an active connection event semantic. It should be noted that use of call identifiers (IDs), called/calling party IDs, call content IDs, etc. may also be included with respect to the reporting.

The active connection event semantic may indicate actions associated with an active connection change in a communication flow. The active connection change may include a redirection, alerting (ring), answer, etc. Accordingly, the active connection event semantics may indicate that there is a change in the endpoints associated with a communication flow. With each connection event the phone numbers associated with the event may also be reported. In this way, all endpoints involved in a traced communication flow, including how and when they were included in the communication flow can be deduced solely from the connection events, even when the connection events occur in parallel.

Table 2 illustrates various messages in accordance with the PKT-SP-ESP1.5-I01-050128 specification for examples of actions associated with an active connection change. It should be noted that such messages are set forth for illustrative purposes only, and thus should not be construed as limiting in any manner.

TABLE 2

| Call Action Event Messages | Description |
| --- | --- |
| Origination | The target subscriber is attempting to originate a call |
| Termination Attempt | There is a call attempt to a target subscriber |
| Answer | A two-way connection has been established for a call under surveillance. Note that termination to a one-way announcement server is not an "answer". |
| Redirection | A call under surveillance is redirected (e.g., via termination special service processing or via a call transfer |
| Conference Party Change | A third, or more additional parties are added to an existing call under surveillance to form a conference call, or any party in a conference call under surveillance is placed on hold, or retrieved from hold |
| Release | The resources for a call under surveillance have been released |

In one embodiment, the communication flow may include actions correlated according to the subscriber associated therewith, as described above with respect to FIG. 3. In some embodiments, correlating based on the subscriber may optionally be useful when the network over which the communication flow is performed originates or answer calls on behalf of the subscriber. For example, when using "Find-Me-Follow-Me" features, a termination attempt may go to "Music-on-hold" and then to "Voice Mail". Thus, while the addresses associated with the actions may change throughout the communication flow, the communication flow thus appearing to have made multiple originations in sequence, all of which were abandoned by the address before answer, the subscriber may remain consistent.

From a telephony application server point of view, "Find-Me-Follow-Me" feature is a sequence (or a concurrent set) of call redirections where the physical media connection is not altered until a known destination has answered. The telephony application server reports "Find-Me-Follow-Me" as a single call. It represents alternative terminating destinations as redirects, possibly concurrently. Since the HI2 action messages alone may not necessarily indicate the intent, the HI2 call action events may be associated with supplementary signal messages, as described below. Just by way of example, a phone number may not necessarily have intent, whereas the subscriber may have intent, and using an address to correlate the actions may inconsistently represent one or the other.

In one embodiment, the context of every communication being monitored may be glued together by a single persisting ID. In VoIP networks, this ID may be a copy of the initial session initiation protocol (SIP) call ID or other billing ID. These IDs may be generated by systems other than the application server. In some feature-enhanced call flows the initial call leg may terminate before the call terminates, and thus the initial SIP call ID or external billing ID may no longer be in reported. Because of the way applications features interact, it is up to the reporting mechanism to maintain its own knowledge of call sessions associated with the ID of a single communication being monitored.

An additional convention may also be used in the parameterization of HI2 messages. Applications redirections may occur to media servers, voice mail servers, network announcements, SIP uniform resource identifiers (URIs), and even other applications servers. To distinguish these endpoints, the "genericName" parameter inside a PartyId structure may include the correct text. For example, if a call is redirected to a media server due to call park, the "genericName" of the "PartyId" may be selected from either "MusicOnHold" or "AnnouncementServer". All calls may optionally be marked the same way.

Moreover, as shown in operation 406, a description of the action is reported to the lawful intercept framework utilizing a second semantic, wherein the first semantic is different from the second semantic and where in response to a determination that the description is unknown at a time that the action occurs, the reporting of the action for the purposes of lawful intercept is distinct from the reporting of the description of the action for preventing delay in reporting the action as a result of waiting for acquisition of the description of the action. With respect to the present embodiment, the description of the action may include any information describing the action. In one embodiment, the description of an action may be associated with such action by order and proximity in time, or by a common billing, session, or action ID (e.g. at the DF) for reporting to the lawful intercept framework. As another option, the generation of messages for the HI2 may partially be based on billing event records or other asynchronous sources.

Further, the second semantic may include any predefined format utilized for reporting the description of the action that is different from the first semantic. Optionally, the second semantic may also include a packet-cable specification HI2 reporting semantic that is within the acceptable use of that protocol. For example, the second semantic may be in accordance with the PKT-SP-ESP1.5-I01-050128 specification. To this end, the second semantic may optionally include supplementary signal semantic.

The supplementary signal semantic may include supplementary information associated with each active connection event (i.e. a description of each action) for indicating why the active connection event (e.g. the active change in the communication flow) occurred and/or how the active connection event was invoked, and thus may provide knowledge of what participants of the communication flow are experiencing. For example, the description of the action may indicate a type or nature of a communications experience as perceived by an active participant in the communication flow. Such communications experience may include a music on hold, a custom ringback song, a network announcement indicating that all circuits are busy, etc. In various embodiments, the description of the action may include causes for routing changes, responsibilities for actions, descriptions of non-default experiences, etc. As an option, the supplementary information may include a uniform resource locator (URL) or any other type of link that points to data or a real-time feed of information associated with the action.

The supplementary signal semantic may indicate the various features that are applied to the communication flow, such as call hold, group pickup, conference, and find-me follow-me. Activities outside of active connection setup may not necessarily be reported. For example, interactions with web portals that do not involve active call connections may simply be considered information service interactions.

In another embodiment, the supplementary signal semantic may be utilized for reporting the feature that was invoked to cause the action associated with the communication flow. Just by way of example, a redirection message may be used for all redirection events indicating a real change in the communication flow. The redirection message may be a call action execution event. As another example, the supplementary signal semantic may indicate how a call was placed on hold. As yet another example, the supplementary signal semantic may indicate that the subscriber is hearing a dial tone.

Table 3 illustrates examples of supplementary signal HI2 messages. These semantics may optionally work with VoIP. For example, unlike telephones on the PSTN, VoIP feature servers may interact with multiple distinct phones individually, and use new application semantics that when executed together in a coordinated way create new features. The semantics may also allow for intelligence on the customer premise endpoint, as an option. Yet again, it should be noted that the supplementary signal HI2 messages shown in Table 3 are set forth for illustrative purposes only, and thus should not be construed as limiting in any manner.

TABLE 3

| Supplementary Event Messages | Description |
| --- | --- |
| NetworkSignal | The TSP network requested the application of a signal toward the surveillance subject that alters the communications experience of the subject. |
| ServiceInstance | A service event has occurred that has logically changed call connectivity or call routing. |
| SubjectSignal | The target subscriber sends dialing or signaling information to the TSP network to invoke or control a telephony feature or service. |

In order to utilize the actual messages as defined by PKT-SP-ESP1.5-I01-050128, a modified convention may be utilized for reporting within the context of the standard parameterization. In one embodiment, a NetworkSignal message may have an "other" parameter that allows free text descriptions. This may be used for signals not described in the other parameters. Optional values for this parameter may include "MoH" to indicate generic Music on Hold, "CustomMoH" to indicate user-selected Music on Hold, "CustomRingback" to indicate that a user-defined Ringback tone is heard prior to answering a termination attempt, "NetAnnounce" to indicate a generic network announcement (e.g. a verbal network announcement), and/or "NetAnn:<text>" to indicate a generic network announcement with the abbreviated text of the announcement included (e.g. up to 128 bytes).

In VoIP CallWaiting may not necessarily always be detectable, and it may be the endpoint that generates any related alerting for CallWaiting. With VoIP, one phone can have a call waiting indicator since it is in use, but three other extensions of that same phone may also be ringing. As an option, the details of how each of the endpoints reacts to an incoming call can be managed either by the endpoints or by the service provider.

Service instance messages may be the least flexible. The "Service_Name" parameter has a short enumeration of services per PKT-SP-ESP1.5-I01-050128, including Call_Block, Call_Forward, Call_Waiting, Repeat_Call, Return_Call, and/or Three_Way_Call. However, applications services may be the most flexible. In order for an application to report the communication flow using an existing DF, the HI2 messages may send additional names in addition to the limited enumeration or parameter values for "Service_Name". These additional names may reflect the possible application features that may be applied to autonomously change call routing. To do this, either the DF and HI2 receiver may not validate the Service_Name parameter value, or the DF and HI2 receiver may include the additional possible values in the validation.

The "Service_Name" parameter may include additional values in its enumeration, including "DND" indicting do not disturb (when pre-set prior to call origination), "ACR" indicating anonymous call rejection, "FMFM" indicating find-me-follow-me through a list of multiple endpoints, "FMFM-Simultaneous" indicating find-me-follow-me by concurrently ringing multiple endpoints, "CFU" indicating call forward unconditional, "CFNA" indicating call forward no answer (often forwarding to voicemail), pickup, group-pickup, and/or "NetAnnWithInput" indicating a network announcement is to be played that allows user input.

The SubjectSignal may be used to indicate actions by the subscriber associated with a telecommunication. This message may include the "OtherSignalingInformation" parameter. The "OtherSignalingInformation" parameter may include values including, but not limited to, "ClickToCall", hold, hold release, a "Park Park" feature used to put a call on hold so that other phones can release it, a "Pickup Pickup" feature used to attempt to answer a parked call, a "Group Pickup Group Pickup" feature used to attempt to answer a call, a "BLA" action invoked over a Bridged Line Appearance, a "DND" indicating do not disturb (when invoked while an unanswered call is alerting), and/or a "Transfer Blind Transfer" invoked that takes the target subscriber out of the call immediately. It should be noted that the above examples of a NetworkSignal message, a ServiceInstance Message, and a Subject Signal message may be dependent on the features available in a TSP deployment, and may be adjusted as desired.

Moreover, SubjectSignal messages may optionally only occur when the subscriber invokes a call connection change in real-time causing a call connection event. In cases where a feature (such as a hold) is invoked by another other party to cause a connection event, or by an autonomous application executing a feature, a ServiceInstance message may be used to report that invocation. Additionally, NetworkSignal messages may be used only to indicate that a caller is receiving some notification from the telephone system, such as a "busy tone" or "music on hold". The NetworkSignal message may indicate a change in the end subscriber experience that occurs as the result of a connection event.

As noted above, the action may be reported distinctly from the description of the action, such that any additional time (after the occurrence of the action) required to acquire (e.g. collect, etc.) the description of the action may be prevented from causing a delay of the reporting of the action. For example, if it is determined that the description is unknown at a time that the action occurs (e.g. that additional information must be collected for generating the description of the action), the reporting of the action for the purposes of lawful intercept may be distinct from the reporting of the description of the action. In this way, delay in reporting the action as a result of waiting for acquisition of the description of the action may be prevented. Thus, the action and the description of the action may be reported separately (e.g. asynchronously), such that an actual change in the connectivity of the traced communication flow may be reported unambiguously, and then the supplementary information explaining that action may be reported.

By separating the reporting of the action from the description thereof, asynchronous actions may be reported asynchronously, and the descriptions of such actions may also be reported asynchronously. As noted above, such separation may enable timely reporting of actions, as required, and near-real time reporting of the description of such actions as it is acquired. Of course, as another option, the action and the description of the action may also be reported together (e.g. in a single HI2 message). For example, the action and the description of the action may be reported together if the description of the action is known at the time that the action occurs, such that both the action and the description thereof may be reported in real-time.

It should be noted that default behavior associated with actions may be presumed. For example, a termination attempt may assume the default behavior that the phone is "ringing" prior to answer. It may be assumed that the default behavior of "ringing" is occurring unless otherwise messaged using a supplementary signal message, for example, indicating that a custom ringback is being played in place of the typical repeated ringback tone.

To this end, by reporting the action utilizing the first semantic and the description of the action utilizing the second semantic, actions may optionally be strictly delineated when being reported versus reporting the reasons behind the actions. As another option, the use of the first semantic and the second semantic in this manner may allow asynchronous and parallel actions to be reported logically as the communication flow, such that law enforcement may understand what is happening, instead of as potentially incomplete collections of separate actions that may or may not necessarily be related.

Moreover, the subscriber's intentions, any actions that occur automatically on behalf of the subscriber (e.g. via an application), experiences of the subscriber in association with progress of the communication flow, etc. may be reported to the lawful intercept framework via the reporting of the action and the description thereof. Still yet, reporting the action, including all routing behaviors for communications associated with the subscriber, and the description thereof, may optionally allow law enforcement to understand the routing that is actually occurring, along with the experiences of the subscriber with respect to the communication flow or the experiences of other participants of the communication flow.

Figure 5:
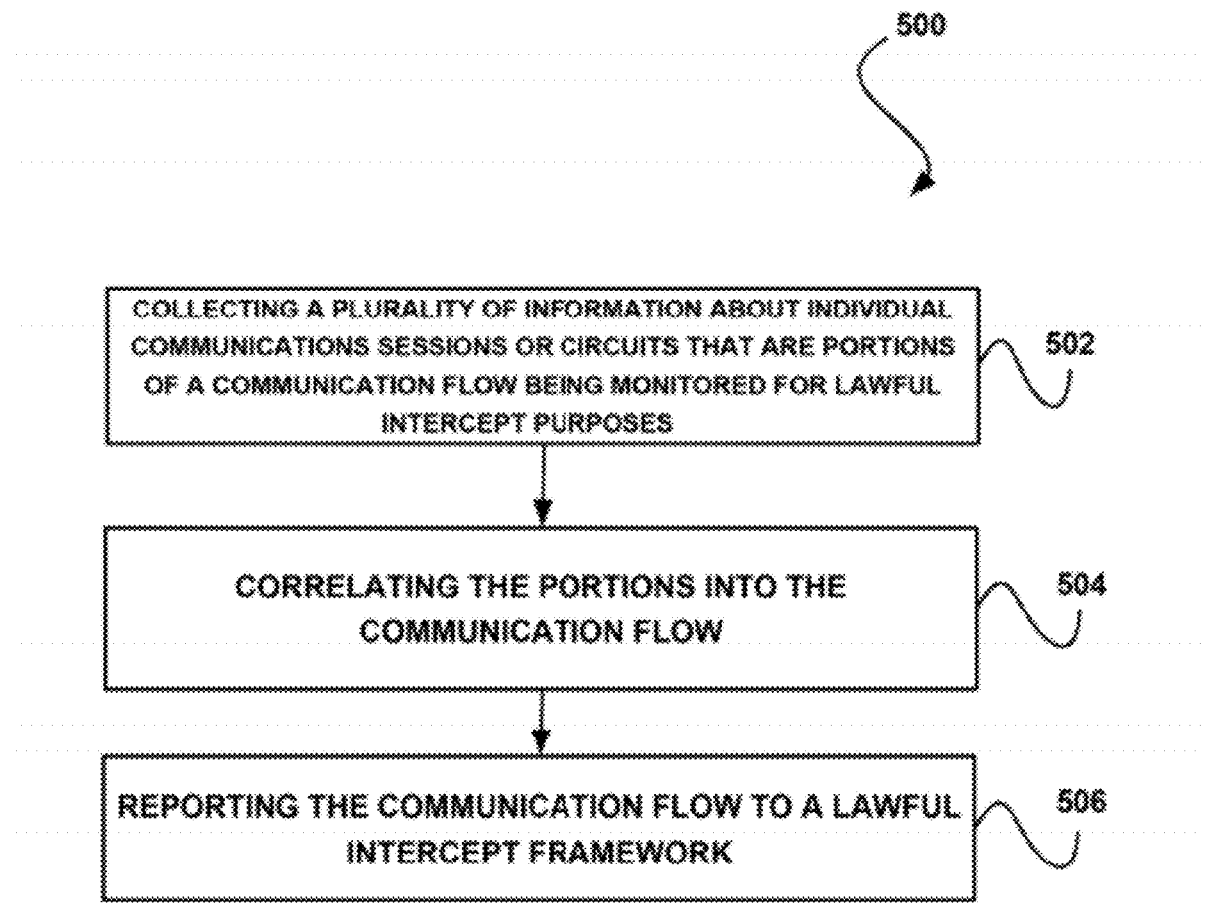
FIG. 5 illustrates a method for reporting a communication flow including correlated portions of the communication flow to a lawful intercept framework, in accordance with another embodiment.

FIG. 5 illustrates a method for reporting a communication flow including correlated portions of the communication flow to a lawful intercept framework, in accordance with another embodiment. As an option, the system 600 may be implemented in the context of the details of FIGS. 1-5. Of course, however, the system 600 may be implemented in any desired environment. Further, the aforementioned definitions may equally apply to the description below.

As shown in operation 502, a plurality of information about individual communications sessions or circuits that are portions of a communication flow being monitored for lawful intercept purposes is collected. To this end, with respect to the present embodiment, the portions of the communication flow may include different sessions, circuits, communications, etc. For example, the individual communications sessions or circuits may occur asynchronously (e.g. different times), in parallel, etc. Just by way of example, the communication flow may include find-me-follow-me, group call pickup, remote call setup (e.g. click-to-call) and/or any other type of communication flow that includes asynchronous portions. Moreover, the information about the individual communications sessions or circuits may include any desired information, such as a source of the individual communications sessions or circuits, a subscriber associated with the individual communications sessions or circuits, etc.

Further, the portions may be collected in any desired manner. In one embodiment, the portions may be collected by monitoring an occurrence of such portions. For example, each portion may be monitored at a device via which the portion occurs, etc.

Further, as shown in operation 504, the asynchronous portions are correlated into the communication flow. In one embodiment, the asynchronous portions may be correlated based on an address associated therewith. For example, asynchronous portions with a same originating address (e.g. phone number, etc.) may be correlated.

In one embodiment, as each portion of the communication flow is collected, it may be stored in a cache and an address associated therewith may be identified. Further, a cache storing previously collection portions of the communication flow may be searched for other portions stored therein that are also associated with the identified address. In this way, portions all associated with a single address may be correlated.

Still yet, the communication flow is reported to a lawful intercept framework, as shown in operation 506. It should be noted that the communication flow may be reported in any desired manner. For example, the communication flow may be reported by reporting the various portions of the communication flow. As another example, the communication flow may be reported by reporting an action associated with each portion and a description of such action (e.g. in the manner described above with respect to FIG. 4).

As an option, the portions may occur on separate systems (e.g. computers, mobile devices, etc.). In one embodiment, the description of an actions may be associated with such action by order and proximity in time, or by a common billing, session, or action ID (e.g. at the DF) for reporting to the lawful intercept framework. As another option, the generation of messages for the HI2 may partially be based on billing event records or other asynchronous sources.

Figure 6:
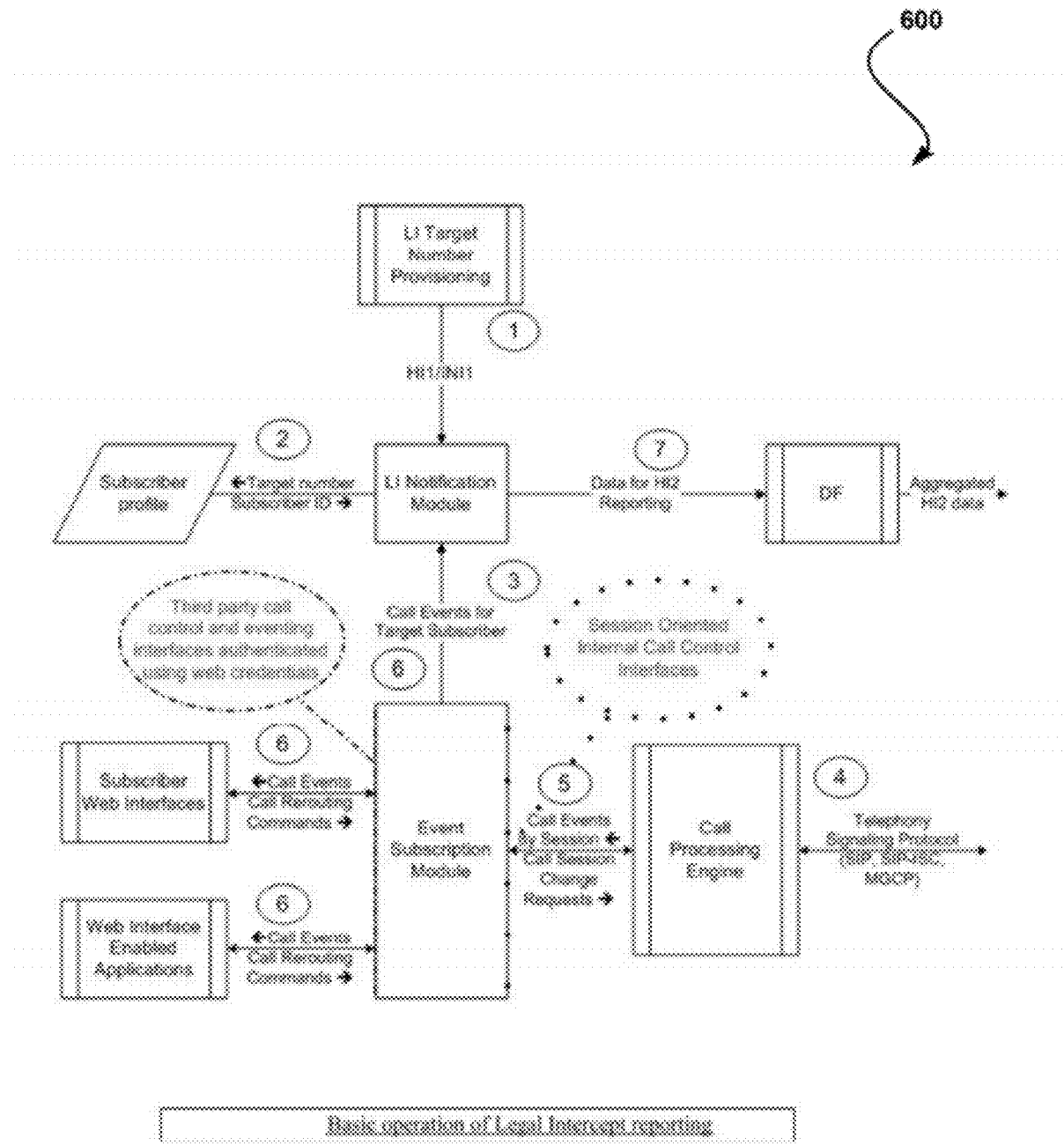
FIG. 6 illustrates a system for reporting a communication flow including correlated actions to a lawful intercept framework, in accordance with another embodiment.

FIG. 6 illustrates a system 600 for reporting a communication flow including correlated actions to a lawful intercept framework, in accordance with another embodiment. As an option, the system 600 may be implemented in the context of the details of FIGS. 1-5. Of course, however, the system 600 may be implemented in any desired environment. Further, the aforementioned definitions may equally apply to the description below.

As shown, the system 600 has a plurality of signaling interfaces (e.g. subscriber web interfaces, web interfaces, etc.), applications interfaces, and lawful intercept framework interfaces. The interfaces may optionally use standard protocols used in telecommunications.

As shown in operation 1, the lawful intercept (LI) notification module receives requests to initiate or halt lawful intercept of a phone number or other telephony identifier. For example, an LI trace request for a phone number may be sent to the LI notification module, thus resulting in an LI target number being provisioned to the LI notification module.

Additionally, as shown in operation 2, the LI notification module attempts to associate a subscriber ID based on the incoming target phone number, and accepts the provisioning when a match is found. For example, the LI notification module may lookup the target phone number in a database storing the subscriber ID in association with the target phone number. In this way, the LI notification module may identify the subscriber associated with the target phone number. Such subscriber may thus be determined to be a target subscriber.

Further, as shown in operation 3, the LI notification module subscribes to receive all actions associated with the target subscriber, including public and private data. If an LI trace is halted, the subscription to receive the actions is cancelled. For example, an LI authenticated subscription for actions for the target subscriber may be sent to an event subscription module.

Moreover, as shown in operation 4, call signaling indicates call execution activity. The call signaling may be provided via a telephony signaling protocol, such as SIP, SIP-Internet Systems Consortium (ISC), Media Gateway Control Protocol, etc. Just by way of example, the call signaling may indicate that an externally originated call is attempting to call the target number, where the origination attempt is granted and the target subscriber's phone is alerted.

As shown in operation 5, actions are generated based on call execution activity and are associated with the subscriber ID. In one embodiment, an action may be generated and sent to the subscription module to indicate the termination request has initiated service initiation on behalf of the target subscriber.

Still yet, as shown in operation 6, the subscription module remaps the information in the action for third party consumption over web interfaces, and forwards the action information to all elements that have subscribed for that action type for that subscriber. As an option, a service initiation action may be sent to the target subscriber's web interface browser, to interested applications at the TSP, and to the LI notification module, etc., as shown. As another option, the LI notification module's notification may include private/blocked data based on the credentials associated with the LI component's authentication.

Furthermore, as shown in operation 7, the LI notification module maps the action into the semantics required by the HI2 interface. The LI notification module searches for cached actions that might be associated with this action for correlation thereof, and subsequently maps that information into the semantics required by the HI2 interface of a communication flow, and forwards the communication flow to the DF. A termination attempt may be sent to the DF that includes the called and calling number. There may not necessarily be any pre-cached information associated with this termination attempt call action, so no additional supplementary messages may be sent to the DF relative to this call action. The DF may thus report the communication flow.

Figure 7:
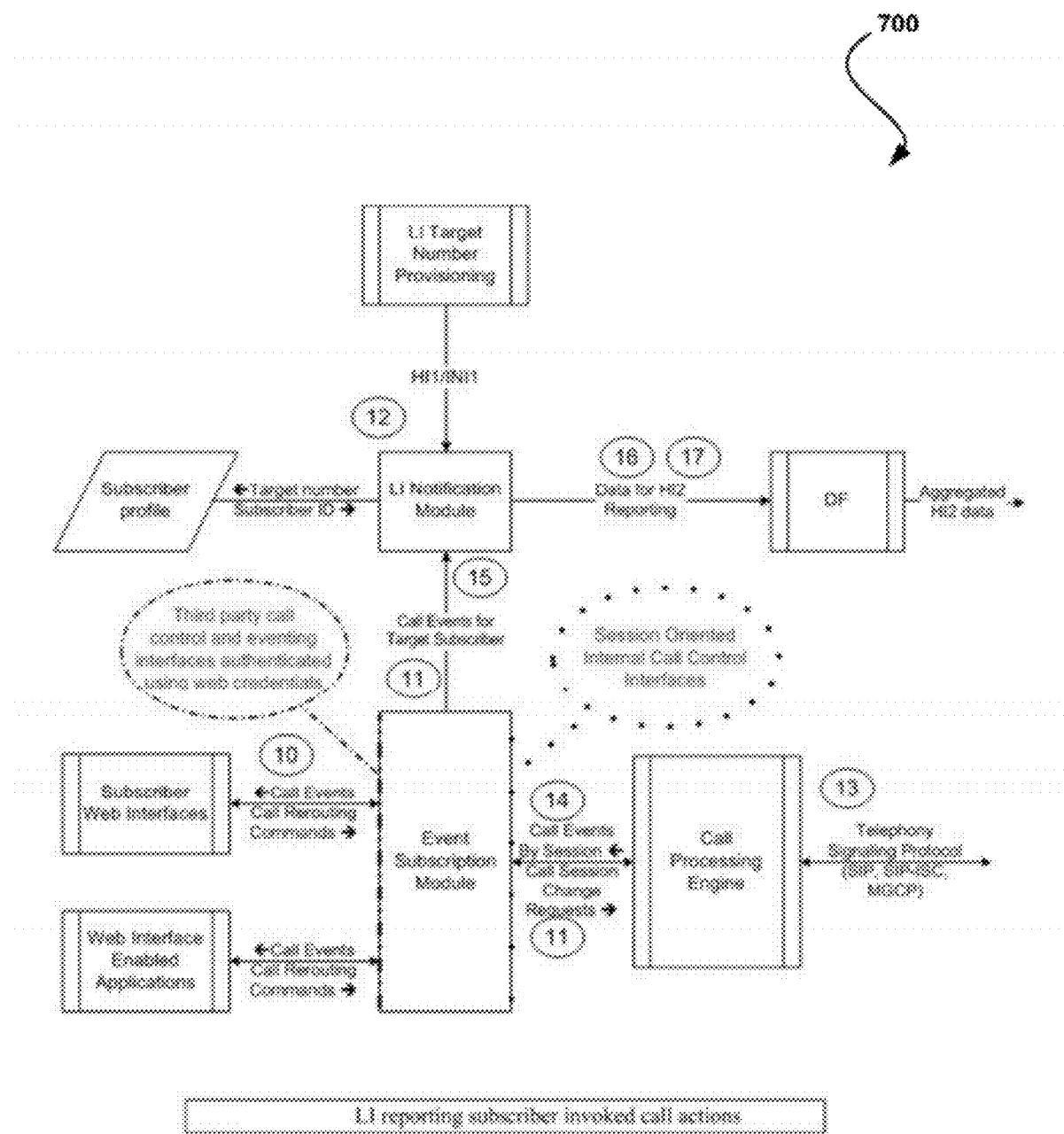
FIG. 7 illustrates a system for reporting a communication flow including subscriber invoked call actions to a lawful intercept framework, in accordance with yet another embodiment.

FIG. 7 illustrates a system 700 for reporting a communication flow including subscriber invoked call actions to a lawful intercept framework, in accordance with yet another embodiment. As an option, the system 700 may be implemented in the context of the details of FIGS. 1-6. Of course, however, the system 700 may be implemented in any desired environment. Further, the aforementioned definitions may equally apply to the description below.

In one embodiment, FIG. 7 may show LI HI2 reporting of target subscriber actions received over a non-telephony interface. The operations of FIG. 7 may sequentially follow operation 7 of FIG. 6, as an option. For example, in operation 6 of FIG. 6 the target subscriber had received a notification of an incoming call on a web interface, which may enable operation 10 to occur where the target subscriber clicks on his web browser for diverting the call.

Thus, as shown in operation 10, the event subscription module receives a command from a web interface authenticated by the target subscriber's credentials. For example, the target subscriber may redirects the call to voice mail by clicking on his web browsers call control web page which sends a redirect to voicemail command to the telephony system via a web service application programming interface (API).

In operation 11, the command is interpreted, matched with session data, and subsequently forwarded to the call processing engine for execution. In addition, the call processing engine sends a service request action back to the event subscription module that is forwarded to the LI notification module. In one embodiment, the call processing engine may receive the request with enough information to execute the transfer of the call in progress directly to the voicemail system. The call processing engine may post a notification of the request, including its source, to the event subscription module, and the service request may be reported to the LI notification module.

Still yet, as shown in operation 12 the LI notification module receives the feature invocation request information that indicates it is associated with an existing call. The LI notification module checks its cache of recent actions associated with the call and applies rules to determine if the feature invocation request is associated with a previous action. If it is not, it then caches the service request information. Optionally, the LI notification module may not necessarily see a call redirect action to associate the just received redirect feature invocation request, so the LI notification module may cache the redirect feature invocation request.

In operation 13, the call processing engine performs the command, and generates signaling and new sessions accordingly. Just by way of example, the call processing engine may sends SIP signaling to redirect the terminating leg of the traced call to the voicemail system.

Furthermore, after the signaling succeeds in executing the command, actions are reported to the event subscription module. Note operation 14. Once the call signaling has executed the redirection of the call to voicemail, an action may be generated and sent to the event subscription module.

In operation 15, the LI notification module receives the forwarded action(s). For example, the LI notification module may receive an action indicating that the call has been redirected to voicemail. The LI notification module associates this action with the previous feature invocation action.

In addition, the LI notification module rewrites the call action event in terms of the semantics required for the HI2 interface, and a notification action is sent to the DF, as shown in operation 16. As a result, an HI2 redirection action is sent to the DF that contains the call ID, the redirected-from and redirected-to information.

Moreover, as shown in operation 17, the LI notification module further processes the call action event. The LI notification module may first look for prior non-action call events that are related to this action. If a related action is found, it is removed from the cache and that information is reported as a supplementary HI2 message to the DF. The call action is then cached. As an option, the LI notification module may determine that the prior feature invocation request action is related to this call action event. The feature invocation request is marked as completed in the cache, and a "SubjectSignal" message is reported to the DF indicating "OtherSignalingInformation" of "VoiceMail" was requested by the target subscriber.

Figure 8:
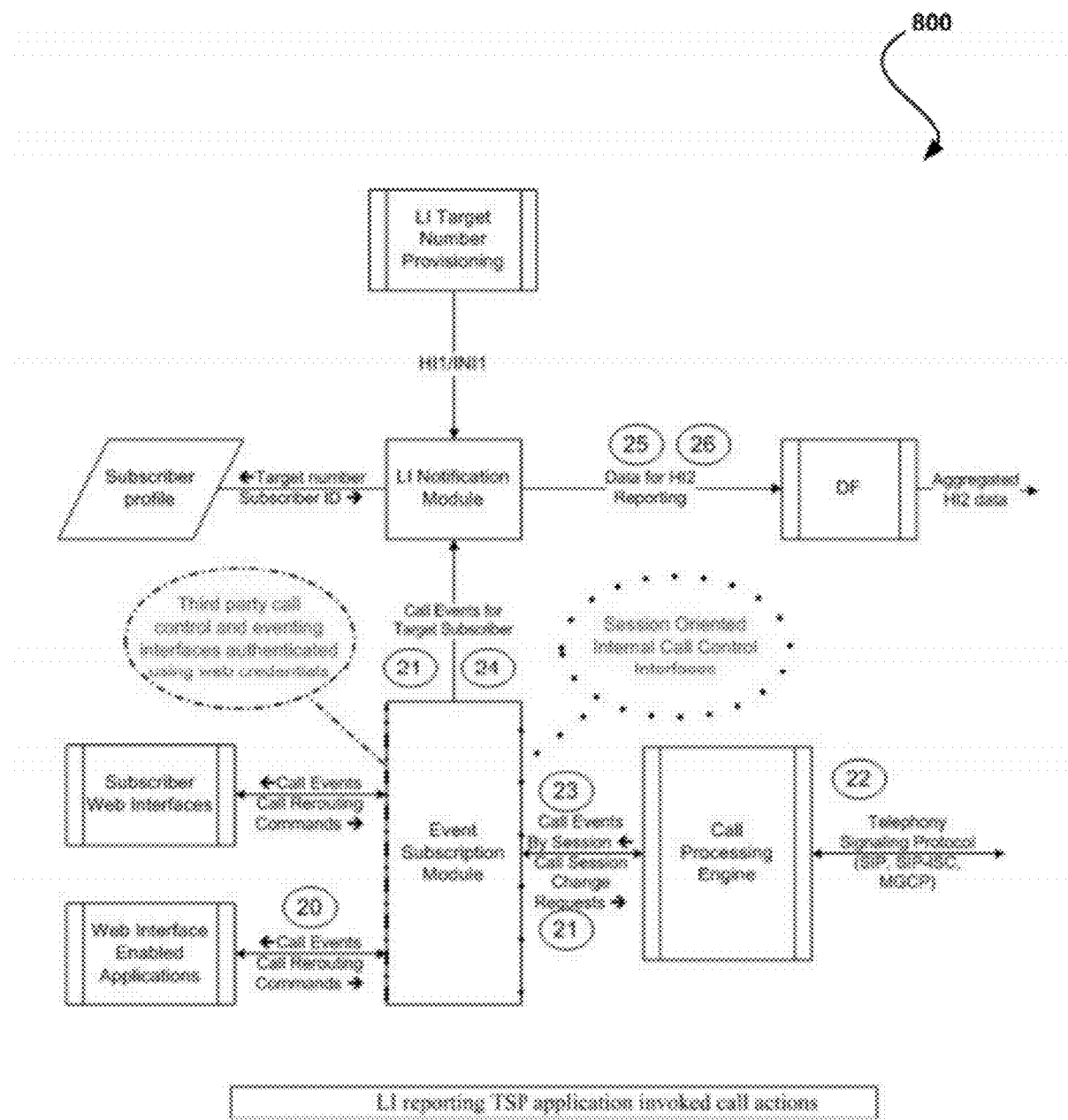
FIG. 8 illustrates a system for reporting a communication flow including telecommunications service provider application invoked call actions to a lawful intercept framework, in accordance with yet another embodiment.

FIG. 8 illustrates a system 800 for reporting a communication flow including telecommunications service provider application invoked call actions to a lawful intercept framework, in accordance with yet another embodiment. As an option, the system 800 may be implemented in the context of the details of FIGS. 1-7. Of course, however, the system 800 may be implemented in any desired environment. Further, the aforementioned definitions may equally apply to the description below.

The operations of FIG. 8 may be performed in parallel with the operations of FIG. 7, as an option. For example, FIG. 8 shows LI HI2 reporting an actions requested by TSP applications over a non-telephony interface. The operations in FIG. 8 may follow sequentially from operation 7 in of FIG. 6. For example, in operation 20 the TSP application may autonomously invokes "do not disturb" for all calls based on a preset timer.

To this end, in operation 20, the event subscription module receives a command from a web interface with administrative authenticated credentials. For example, an external application may set "Do Not Disturb" at a pre-specified time of day for all incoming calls. The command may be sent to the telephony system via a web service API.

In operation 21, the command is interpreted and subsequently forwarded to the call processing engine for execution. The call processing engine sends a feature invocation action back to the event subscription module which is forwarded to the LI notification module. For example, the call processing engine may receive the request to invoke "Do Not Disturb" for all incoming calls starting immediately. The call processing engine may further post a notification of the request, including the source, to the event subscription module. The feature invocation request may further be reported to the LI notification module.

Additionally, in operation 22, the LI notification module receives the feature invocation request information that indicates it is not associated with an existing call. The LI notification module checks for all calls that may be effected by the feature invocation (e.g. the result may be none), and associates a copy of the action with each of those calls. If there are no calls in an unanswered state, the action may be ignored. In one embodiment, the LI notification module may checks for all calls that are not in an answered state. For example, there may be one existing call that is unanswered, so LI notification module caches the "Do Not Disturb" feature invocation request with that call.

Further, in operation 23, the call processing engine finds all unanswered calls in progress, and performs the command and generates appropriate redirection signaling. The call processing engine may send SIP signaling to redirect the terminating leg of the traced call to the voicemail system.

Still yet, after the signaling succeeds in executing the command, actions are reported to the event subscription module. Note operation 24. Once the call signaling has executed the redirection of the call to voicemail, an action may be generated and sent to the event subscription module.

In operation 25, the LI notification module receives the forwarded action(s). In one embodiment, the LI notification module may receive an action that the call has been redirected to voicemail. The LI notification module may associate such action with the previous feature invocation action.

Moreover, in operation 26, the LI notification module rewrites the call action event in terms of the semantics required for the HI2 interface, and a notification action is sent to the DF. For example, an HI2 "redirection" action may be sent to the DF that contains the call ID, the redirected-from and redirected-to information.

In operation 27, the LI notification module further processes the call action event. The LI notification module may first look for prior non-action call events that are related to this action. If a related action is found, it may be removed from the cache and that information is reported as a supplementary HI2 message to the DF. The call action may then be cached. As an option, the LI notification module rules may determine that the prior feature invocation request action is related to this call action event. The feature invocation request may be marked as completed in the cache, and a "ServiceInstance" message may be reported to the DF indicating a "DoNotDisturb" feature was executed autonomously.

As an option, the LI notification module may enable the translation of external asynchronous actions into sequential actions for lawful intercept. The LI notification module may optionally only report information based what it receives, thus the completeness of information in the incoming actions may directly effect the completeness and correctness of the information reported to the lawful intercept framework. To build such an LI notification module, it may optionally be assumed that input actions are systematically structured.

Each target subscriber may optionally be handled separately in the LI notification module. In one embodiment, a single real action may be generated for every target subscriber involved with that action due to the action subscription process. The processing of actions for each target subscriber may be completely separate from all others. Just as the production of HI2 actions for one target subscriber may be required to be totally separate from all other target subscribers, the LI notification module may also processes actions for each subscriber separately.

Each incoming action to the LI notification module may be processed sequentially. The message may optionally be associated with an existing call, and unless there is a feature invocation in progress, each action may have a simple mapping to a call action event that can be reported to the HI2 interface. As actions are processed, each action, HI2 messages, and whether or not the action has not yet been reported over HI2 is cached in associated with each call.

With respect to application action reporting, a feature invocation action, or "FI" action, is generated when features are applied to a call, or an application action is associated with an incoming call event. These actions can explicitly include the source for the FI, or it may be implicitly sourced by an application. This identification of the application's execution may set expectations on the type of application behavior that will occur. In the actions received by the LI notification module some details of exactly how actions will affect call connectivity may not necessarily be stated. To fill in this data, the LI notification module may know what types of actions to look for, and how to treat them until the scope of the feature invocation ends.

Figure 9:
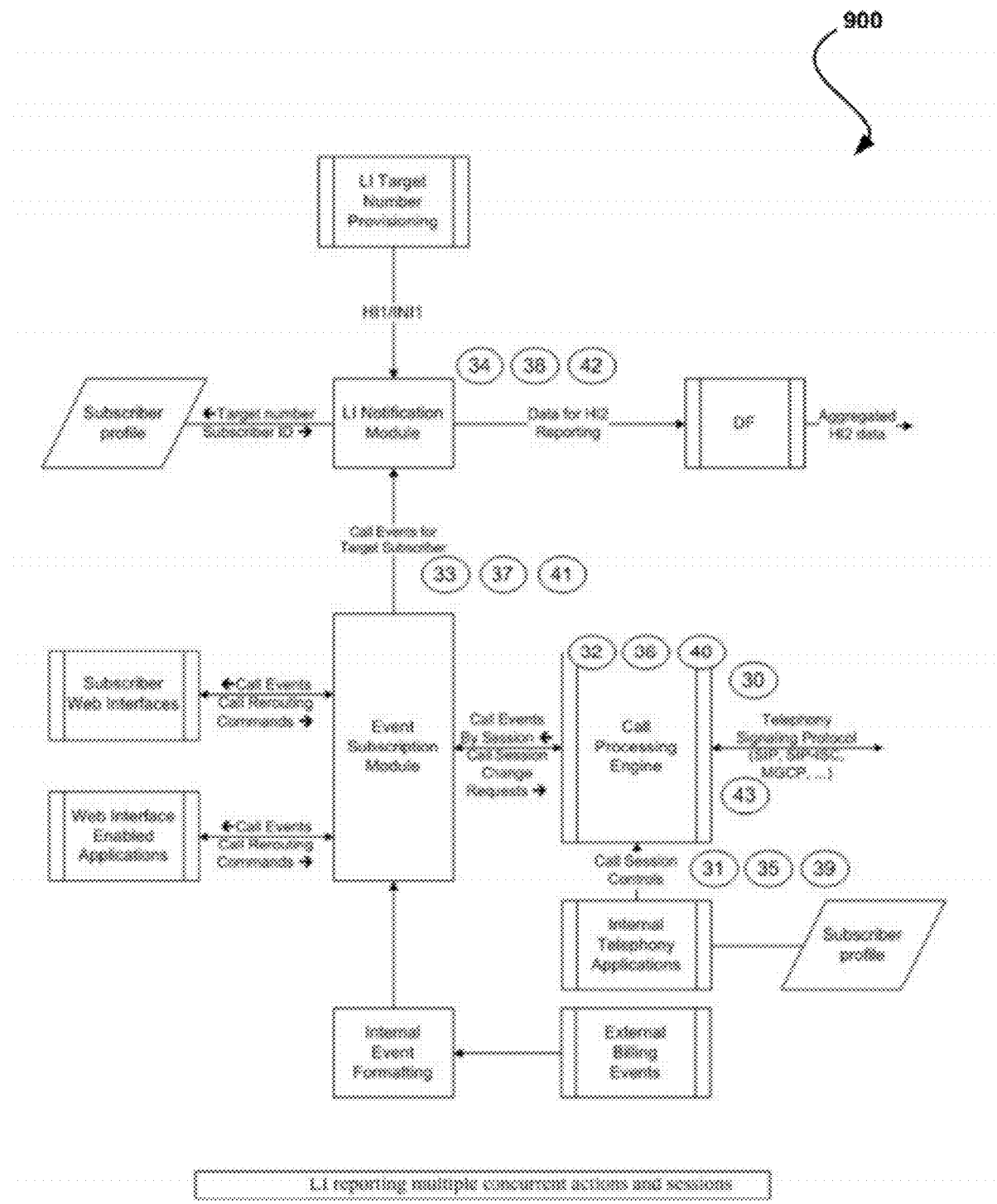
FIG. 9 illustrates a system for reporting a communication flow including multiple concurrent actions and sessions, in accordance with still yet another embodiment.
Figure 10:
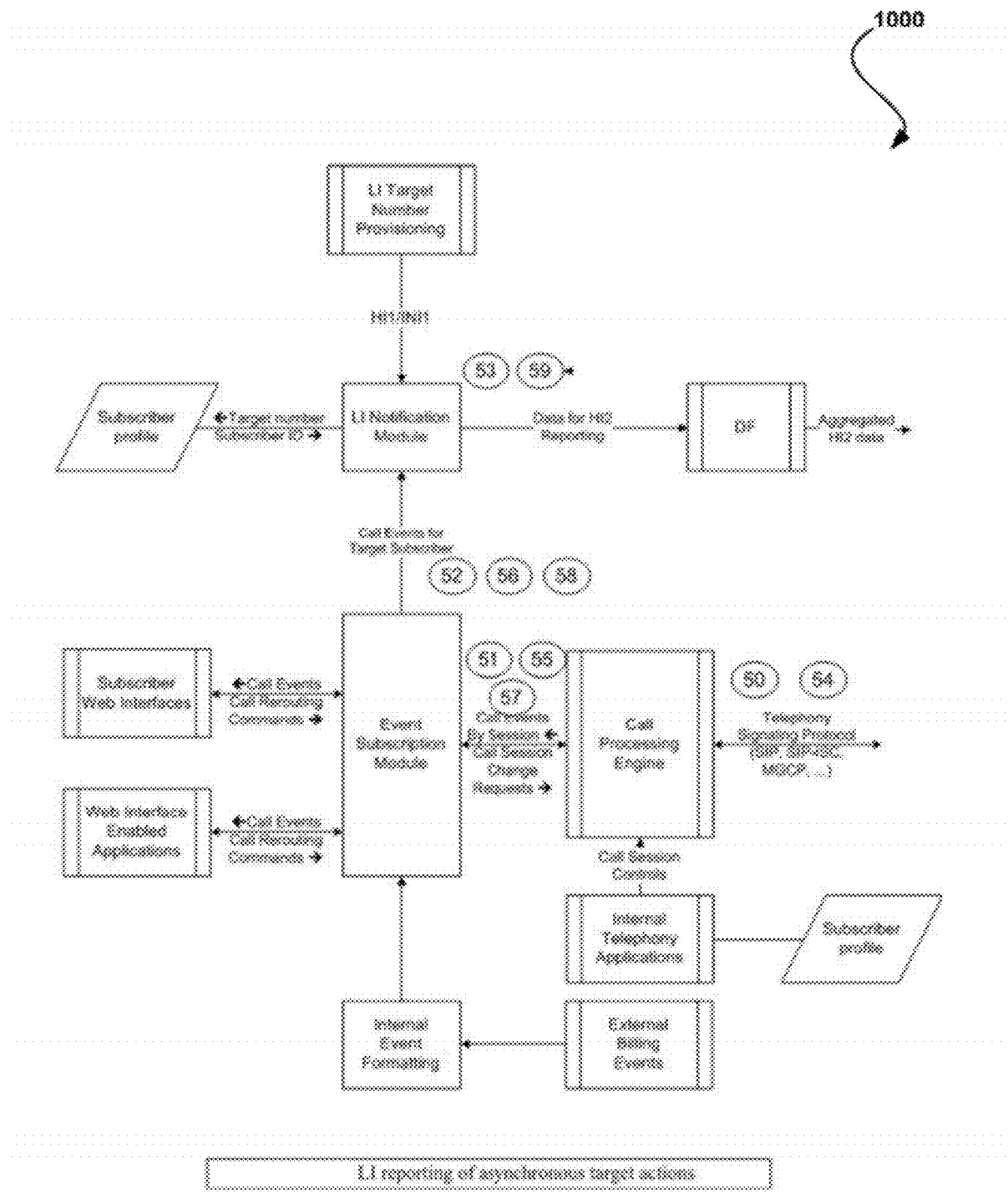
FIG. 10 illustrates a system for reporting a communication flow including asynchronous target actions, in accordance with another embodiment.

FIGS. 9 and 10, as described below, provide examples of this processing. In FIG. 7 a find-me-follow-me feature is invoked. In FIG. 10 a group pickup feature is invoked. Once each feature is invoked, a context for interpreting additional actions is set up, until some pattern is matched that indicates that the feature invocation is complete. The example in FIG. 9 shows the FI action occurring before the call action events, whereas the example in FIG. 10 shows the FI occurring after the call action event. It should be noted that other feature invocations may be reported and processed similar to that shown in FIGS. 9 and 10.

FIG. 9 illustrates a system 900 for reporting a communication flow including multiple concurrent actions and sessions, in accordance with still yet another embodiment. As an option, the system 900 may be implemented in the context of the details of FIGS. 1-8. Of course, however, the system 900 may be implemented in any desired environment. Further, the aforementioned definitions may equally apply to the description below.

With respect to FIG. 9, the processing of a call is traced where the TSP call processor performs Find-Me-Follow-Me feature redirections to a call. The actions in FIG. 7 are for a new incoming call to a target subscriber. For example, in operation 30, the TSP application autonomously invokes "FMFM" for this calls based on settings defined by the target subscriber at an earlier time.

In operation 30, an incoming call is presented to the call processing engine where the called number is the target subscriber's number. Based on the target subscriber's saved profile, the call processing engine autonomously determines that routing will be determined by the FMFM internal telephony application.

In operation 31, the FMFM application makes special attempts to terminate this call. Multiple endpoints may be rung sequentially until the call is ultimately answered. In one embodiment, the call processing engine may be instructed to forward the incoming call to a media server for music-on-hold, as well as to originate a new call to the mobile phone PSTN number in the target subscriber's profile. The "calling party" in this call is the original calling party. The application may set a response timer associated with the origination.

Additionally, in operation 32, the call processing engine sends out multiple actions to the event subscription module including sending a call initiation action for the incoming termination attempt, a feature invocation action for FindMe-FollowMe, a call initiation action for the call to the target subscriber's mobile phone (which indicates it is from the initial caller's phone, but it is authorized by the target subscriber, and is due to the FMFM application), a redirection action of the incoming call to a media server for music on hold, and is due to the FMFM application, and a connection answered action for the incoming call to the media server. All action components may share an identifier associated with servicing the initial incoming call.

Further, in operation 33, actions are rewritten and forwarded to the LI notification module in the order they are received. In operation 34, the LI module processes the messages. In one embodiment, there may be redundant information. Correct processing may not necessarily depend on the feature invocation action arriving first as the redirection and call initiation actions include the application name. The HI2 messages sent to the DF may include TerminationAttempt: from=<calling party> & to=<target subscriber>, Redirection: redirected-from=<target subscriber> & redirected-to=<target's mobile number>, ServiceInstance: ServiceName=FMFM & callingparty=<calling party>, and NetworkSignal: other=MoH & subject=<calling party>.

The LI module may become aware that the FMFM application is in use either by the feature invocation itself, or from the properties of the redirection of origination actions. Once aware, it may maintain the processing context for interpreting incoming actions until the original incoming call is answered or released. The module applies different rules for converting incoming actions. It should be noted that this call flow may be consistent with circuit-switched processing in that providing music on hold concurrently with a redirection to another phone number may not be possible. However, logically that is what is occurring from a subscriber point of view, and thus expresses the logical effect of the call flow.

In operation 35, the application response timer expires, and the call to the mobile phone is not answered. As a result, the application tells the call processing engine to perform the following: release the call to the target subscriber's mobile phone, originate a new call to another endpoint based on the target subscriber's profile (in this case an undistinguished PSTN number), and restart the music on hold for the original call (which includes an announcement that the system is attempting another number).

Additionally, with respect to operation 35, an application response timer is started. In operation 36, the call processing engine signals the endpoints appropriately, and sends out multiple actions to the event subscription module. The actions may include a call release action for the call to the target subscriber's mobile number, a call initiation action for the call to the undistinguished PSTN number (e.g. as before, this action indicates it is from the initial caller's phone, but it is authorized by the target subscriber, and is due to the FMFM application), and a redirection action of the incoming call to a media server for an announcement followed by music on hold, and is due to the FMFM application. The actions are may not necessarily be sent in a deterministic order since execution of the signaling may vary based on external factors.

Moreover, in operation 37, actions are rewritten and forwarded to the LI notification module in the order they are received. As shown in operation 38, the LI module processes the messages and the resulting HI2 messages sent to the DF are Redirection: redirected-from=<target's mobile number> & redirected-to=<undistinguished PSTN number>, ServiceInstance: ServiceName=FMFM & callingparty=<calling party>, and NetworkSignal: other="NetAnn: Trying another number+MoH" & subject=<calling party>.

The LI notification module may remain aware that the FMFM application is in use. In this situation, the default NetworkSignal announcement contents may be known based on the standard execution pattern for FMFM. However, if non-default behaviors is available, then it may be expected that the announcement used will be indicated in the billing record, and subsequently it can also be included in the content of the NetworkSignal action.

In operation 39, the second application response timer expires, and the call to PSTN number is not answered. As a result, the application may tell the call processing engine to release the call to the PSTN number and redirect the original call to VoiceMail.

Furthermore, with respect to operation 40, the call processing engine signals the endpoints appropriately, and sends out multiple actions to the action subscription module. The actions may include a call release action for the call to the PSTN number, and a redirection action of the incoming call to voice mail, and is due to the FMFM application. These actions may not necessarily be sent in a deterministic order since execution of the signaling may vary based on external factors.

In operation 41, actions are rewritten and forwarded to the LI notification module in the order they are received. In operation 42, the LI module processes the messages. The resulting HI2 messages sent to the DF may include Redirection: redirected-from=<undistinguished PSTN number> & redirected-to=<Voice Mail>, and ServiceInstance: ServiceName=FMFM & callingparty=<calling party>. The LI notification module may remain aware that the FMFM application is in use. Termination to voice mail may be a known final state for FMFM.

Still yet, in operation 43, the voice mail system signals it has answered the call, and this is messaged through the system to the LI notification module, and subsequently to the DF. The "answer" method may indicate that the FMFM application has completed and is no longer involved.

FIG. 10 illustrates a system 1000 for reporting a communication flow including asynchronous target actions, in accordance with another embodiment. As an option, the system 1000 may be implemented in the context of the details of FIGS. 1-9. Of course, however, the system 1000 may be implemented in any desired environment. Further, the aforementioned definitions may equally apply to the description below.

FIG. 10 shows tracing of an incoming call that is answered using the group pickup feature. The actions in FIG. 10 are for a new incoming call. Processing is described for the two cases. The first case (hereinafter Case 1) includes a call to the target subscriber, but answered by another subscriber using Group Pickup. The second case (hereinafter Case 2) includes a call answered by the target subscriber using Group Pickup.

In operation 50, an incoming call is presented to the call processing engine. In Case 1, the called number is the target subscriber's number. In Case 2, the called number is not the target subscriber's number, but it belongs to someone in the same pickup group as the target subscriber.

In operation 51, the call processing engine signals to ring the intended endpoint, and a single call termination action is sent to the event subscription module. In operation 52, the event subscription module looks for matching subscriptions for this action. With respect to Case 1, the action includes the target subscriber, and is forwarded to the LI notification module as part of the target subscriber's subscription. With respect to Case 2, the action does not include any target subscribers, and is not forwarded to the LI notification module.

Additionally, in operation 53, a TerminationAttempt HI2 message is sent to the DF in Case 1 and nothing occurs in Case 2. In operation 54, the phone rings. Another person in the same office hears the ringing, and without knowing exactly which phone is called, invokes the "group pickup" feature to answer the call on his own phone. To invoke this feature, the subscriber originates a call by dialing the feature code "group pickup". In Case 1, the answerer is not a target subscriber (whose actions are to be intercepted for reporting the lawful intercept framework). In Case 2, the answerer is the target subscriber.

Further, in operation 55, the call processing engine generates a call origination action for the group pickup action. In Case 1, the call origination action is generated from=<group-pickup invoking subscriber> & to=21 2-digit feature star code for group pickup>. In Case 2, the call origination action is generated from=<target subscriber> & to=<2-digit feature star code for group pickup>. The call processing engine also generates a feature invocation action for "Group Pickup". It should be noted that call processing actions may be unaware of who is a target subscriber. The actions generated may be the same for Case 1 and Case 1, but how the numbers map to target subscribers may be different for Case 1 and Case 1.

In operation 56, actions are rewritten and forwarded to the LI notification module in the order they are received based on subscription. In Case 1, no actions are forwarded, and no action occurs in the LI notification module. In Case 2, the two actions generated in operation 55 are forwarded, resulting in one HI2 call origination message to a "2-digit star code".

In operation 57, the incoming call is transferred and answered nearly instantly after step 55. When the execution is performed, the call processing engine generates the following actions: the incoming leg of the incoming call is redirected to the originator of the group pickup invocation, and the reason is "Group Pickup"; it is not determinate, but either the incoming call, or the subscriber originated call is released and only one call survives; and a call answer action is sent for the remaining call.

In operation 58, actions are rewritten and forwarded to the LI notification module in the order they are received based on subscription. In both Case 1 and Case 2, the first and third actions are forwarded to the LI notification module based on the target subscriber's subscription. The direction of the redirection will vary depending on which call session is released. The reporting of the released call also varies based on whether the released call is associated with the target subscriber before the redirection occurs. In Case 1, the release of the original call will be reported if that occurs. In Case 2, the release of the group pickup invocation call will be reported if that occurs.

In operation 59, the LI notification module is programmed to disregard the call release because the relevant call leg for surveillance is now part of a call created using "Group Pickup". For the purposes of this example, it may be assumed that the original call from the PSTN was released. For Case 1, the following HI2 messages may be sent to the DF associated with the call ID for the call already in progress: Redirection: redirected-from=<target-subscriber> redirected-to=<group-pickup originating subscriber>; ServiceInstance: ServiceName="Group Pickup" & callingparty=<group-pickup invoking subscriber>. For Case 2, Redirection: redirected-from=<2-digit star code for group pickup> redirected-to=<incoming caller>; and SubjectSignal: OtherSignalingInformation="Group Pickup".

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for monitoring a plurality of actions associated with at least one communication for lawful intercept purposes;
   computer code for correlating the actions into a communication flow independent of an address associated with the actions; and
   computer code for reporting the communication flow to a lawful intercept framework;
   wherein the computer program product is operable such that the actions are correlated utilizing a unique identifier of a subscriber associated with the actions;
   wherein the computer program product is operable such that an address utilized to perform each action is determined to be associated with the unique identifier of the subscriber, and the correlation is based on the determination;
   wherein the computer program product is operable such that at least a portion of the actions are associated with a different address and each of the different addresses is associated with the unique identifier of the subscriber, such that the portions are correlated based on the determination that each address utilized to perform each action is associated with the unique identifier of the subscriber.

2. The computer program product of claim 1, wherein the actions are invoked by the subscriber.

3. The computer program product of claim 1, wherein the actions are invoked by telecommunications service provider application.

4. The computer program product of claim 1, wherein the communication includes a transfer of content.

5. The computer program product of claim 1, wherein the communication includes a VoIP call.

6. The computer program product of claim 1, wherein the address is stored in association with the unique identifier of the subscriber in a database.

7. A method, comprising:
   monitoring a plurality of actions associated with at least one communication for lawful intercept purposes;
   correlating the actions into a communication flow independent of an address associated with the actions, utilizing a processor; and
   reporting the communication flow to a lawful intercept framework;
   wherein the actions are correlated utilizing a unique identifier of a subscriber associated with the actions;
   wherein an address utilized to perform each action is determined to be associated with the unique identifier of the subscriber, and the correlation is based on the determination;
   wherein at least a portion of the actions are associated with a different address and each of the different addresses is associated with the unique identifier of the subscriber, such that the portions are correlated based on the determination that each address utilized to perform each action is associated with the unique identifier of the subscriber.

8. A system, comprising: a processor for:
   monitoring a plurality of actions associated with at least one communication for lawful intercept purposes;
   correlating the actions into a communication flow independent of an address associated with the actions; and
   reporting the communication flow to a lawful intercept framework; wherein the system is operable such that the actions are correlated utilizing a unique identifier of a subscriber associated with the actions;
   wherein an address utilized to perform each action is determined to be associated with the unique identifier of the subscriber, and the correlation is based on the determination;
   wherein at least a portion of the actions are associated with a different address and each of the different addresses is associated with the unique identifier of the subscriber, such that the portions are correlated based on the determination that each address utilized to perform each action is associated with the unique identifier of the subscriber.

9. The system of claim 8, wherein the processor is coupled to memory via a bus.

10. A method, comprising:
    identifying an action associated with a communication flow for lawful intercept purposes, utilizing a processor;
    reporting the action to a lawful intercept framework utilizing a first semantic; and
    reporting a description of the action to the lawful intercept framework utilizing a second semantic;
    wherein the first semantic is different from the second semantic;
    wherein, in response to a determination that the description is unknown at a time that the action occurs, the reporting of the action for the purposes of lawful intercept is distinct from the reporting of the description of the action for preventing delay in reporting the action as a result of waiting for acquisition of the description of the action;

wherein the action includes an active change in the communication flow;

wherein the description of the action indicates a type or nature of a communications experience as perceived by an active participant in the communication flow.

11. The method of claim 10, wherein the description of the action indicates why the active change in the communication flow occurred.

12. The method of claim 10, wherein the description of the action indicates how the active change in the communication flow was invoked.

13. The method of claim 10, wherein the communications experience includes at least one of a music on hold, a custom ringback song, and a network announcement indicating that all circuits are busy.

* * * * *